(12) United States Patent
Zhang et al.

(10) Patent No.: US 9,137,518 B2
(45) Date of Patent: Sep. 15, 2015

(54) METHOD AND SYSTEM FOR CONVERTING 2D IMAGE DATA TO STEREOSCOPIC IMAGE DATA

(75) Inventors: Dong-Qing Zhang, Burbank, CA (US); Izzat Hekmat Izzat, Santa Clarita, CA (US)

(73) Assignee: THOMSON LICENSING, Boulogne-Billancourt (FR)

( * ) Notice: Subject to any disclaimer, the term of this patent is extended or adjusted under 35 U.S.C. 154(b) by 583 days.

(21) Appl. No.: 12/735,402

(22) PCT Filed: Jan. 29, 2008

(86) PCT No.: PCT/US2008/001151
§ 371 (c)(1),
(2), (4) Date: Jul. 12, 2010

(87) PCT Pub. No.: WO2009/096912
PCT Pub. Date: Aug. 6, 2009

(65) Prior Publication Data
US 2011/0050853 A1 Mar. 3, 2011

(51) Int. Cl.
*H04N 15/00* (2006.01)
*H04N 13/00* (2006.01)
*H04N 13/02* (2006.01)

(52) U.S. Cl.
CPC .................................. *H04N 13/026* (2013.01)

(58) Field of Classification Search
CPC ................. G06T 7/0075; G06T 2207/10012; G06T 2207/10021; G06T 7/0065; G06T 2200/08; G06T 2207/10016; G06T 7/0022; G06T 7/2086; H04N 2013/0081; H04N 13/0022; H04N 13/026; H04N 13/0011; H04N 13/0221
USPC .............................. 348/44, E13.026; 345/419
See application file for complete search history.

(56) References Cited

U.S. PATENT DOCUMENTS

| 5,727,078 A | 3/1998 | Chupeau |
| 6,163,337 A | 12/2000 | Azuma et al. |

(Continued)

FOREIGN PATENT DOCUMENTS

| EP | 1865729 | 12/2007 |
| JP | 10-32840 | 2/1998 |

(Continued)

OTHER PUBLICATIONS

Zhang Liang, "Reliability measurement of disparity estimates for intermediate view reconstruction" IEEE ICIP 2002, Jun. 1, 2002, pp. 837-840, XP007905939, ISBN: 978-0-7803-7622-9.

(Continued)

*Primary Examiner* — Andy Rao
*Assistant Examiner* — Jared Walker
(74) *Attorney, Agent, or Firm* — Robert D. Shedd; Jorge Tony Villabon (57) ABSTRACT

Methods and Systems are provided for converting a two-dimensional image sequence into a three-dimensional image. In one embodiment, a method for converting a two-dimensional image sequence into a three-dimensional image includes determining camera motion parameters between consecutive images in a monoscopic sequence of reference 2D images, wherein the consecutive images comprise a current reference image and an adjacent image, determining a horizontal disparity map for a target image using the camera motion parameters, determining a disparity probability value for each disparity vector of the disparity map, and determining a target image as a weighted average of pixel values in the current reference image using the disparity probability values, such that the target image and current reference image comprise a stereoscopic image pair.

18 Claims, 3 Drawing Sheets

(56) References Cited

U.S. PATENT DOCUMENTS

| | | |
|---|---|---|
| 6,233,003 B1 | 5/2001 | Ono |
| 2003/0156751 A1 | 8/2003 | Lee et al. |
| 2004/0051783 A1* | 3/2004 | Chellappa et al. ............... 348/46 |
| 2006/0056727 A1* | 3/2006 | Jones et al. ................... 382/276 |
| 2006/0120594 A1* | 6/2006 | Kim et al. ..................... 382/154 |
| 2006/0193509 A1* | 8/2006 | Criminisi et al. ............. 382/154 |
| 2007/0024614 A1 | 2/2007 | Tam |
| 2007/0122028 A1 | 5/2007 | Sun |

FOREIGN PATENT DOCUMENTS

| | | |
|---|---|---|
| JP | 10-42314 | 2/1998 |
| JP | 10-191396 | 7/1998 |
| WO | WO9953681 | 10/1999 |
| WO | WO2007017834 | 2/2007 |
| WO | WO2007/084267 | 7/2007 |
| WO | WO 2007/096816 | 8/2007 |

OTHER PUBLICATIONS

Sun J, et al, "Stereo matching using belief propagation" IEEE transactions on pattern analysis and machine intelligence, vol. 25, No. 7, Jul. 1, 2003, pp. 787-800, XP001185052, ISSN: 0162-8828.

European Search Report dated Apr. 11, 2008.

Young-Seok Choi etal: "Object Extraction Technique Using Belief Propaganda Stereo Algorithm of Bidirectional Search based on Brightness", IEEK Summer Conference, 2007, vol. 7; No. 1, pp. 313-314.

Donghyun Kim etal_Stereoscopic Video Generation Method using Motion Analysis_May 1, 2007_3DTV Conference_IEEE_pp. 1-4_XP031158176.

Andrea Fusiello etal_A compact algorithm for rectification of stereo pairs_Jul. 1, 2000_Machine Vision and Applications_vol. 12_No. 1_pp. 16-22_XP055036989.

\* cited by examiner

METHOD AND SYSTEM FOR CONVERTING 2D IMAGE DATA TO STEREOSCOPIC IMAGE DATA

This application claims the benefit, under 35 U.S.C. §365 of International Application PCT/US2008/001151 and filed Jan. 29, 2008, which was published on Aug. 6, 2009, in accordance with PCT Article 21(2) on, in English.

FIELD OF THE INVENTION

The present principles relate to methods and systems for generating stereoscopic or three-dimensional images, and more particularly, to methods and systems for generating stereoscopic image pairs from a single sequence of two dimensional (2D) monoscopic images (e.g., 2D video image sequence) having general camera motion.

BACKGROUND OF THE INVENTION

In general, stereoscopic image conversion is a process that involves converting two-dimensional (2D) images or video into three-dimensional (3D) stereoscopic images or video. In one conventional process, a stereoscopic image can be generated by combining two monoscopic views (left and right eye perspective views) captured by two separate cameras positioned at different points, where each camera captures a 2D perspective image (left and right eye views) of a given scene, and where hereby the two 2D perspective images are combined to form a 3D or stereoscopic image. In other conventional methods, 3D or stereoscopic images are generated from original 2D monoscopic images captured by a single video camera, whereby corresponding 2D monoscopic image pairs are estimated using information extracted from the original 2D images. With such methods, the original 2D image can be established as the left perspective view providing a first view of a stereoscopic pair of images, while a corresponding right perspective image is an image that is processed from the original 2D image to generate a corresponding right perspective providing a second view of the stereoscopic image pair.

In one particular conventional scheme, 2D to 3D conversion systems can be configured to generate stereoscopic image pairs from a single sequence of 2D monoscopic images (e.g., 2D video image sequence) using camera motion data that is estimated between sequential 2D images in the source image data. With such techniques, the input 2D image data is often a video segment that is captured with camera motion. After camera motion is analyzed, the right image then can be derived from the 2D image in the input video and the inferred camera motion. 2D to 3D conversion systems can be used to convert 2D formatted image and video data (movies, home videos, games, etc.) into stereoscopic images to enable 3D viewing of the 2D formatted source image data. Together with the first image sequence, the second sequence makes it possible to view the originally two-dimensional images in three dimensions when the first and second image sequences are transmitted to the left or right eye.

Conventional approaches for generating stereoscopic image pairs from a sequence of 2D images using camera motion use depth maps, which are computed from the videos image data with camera, to render/generate the corresponding stereoscopic image pair. In general, these techniques involve estimating camera motion between two consecutive 2D images in monoscopic sequence of 2D images such that they become canonical stereo pair, followed by depth estimation to extract depth maps from the two or more consecutive images using the estimated camera motion. The estimated depth maps are then used to re-render the left eye image into the right eye image. More specifically, assuming two consecutive 2D images, $L_i$, $L_{i+1}$, where the input 2D image sequence is deemed to provide the left eye perspective views, a depth map can be estimated from the 2D images by minimizing a cost function $F(D|L_i, L_{i+1})$ with respect to the depth map D. Assuming the optimal depth map is $\hat{D}_i$, the right image can be rendered by a rendering function: $R_i = \text{Render}(L_i, \hat{D}_i)$.

This conventional approach works well, theoretically, if the depth map can be accurately estimated. An advantage of this approach is that camera motion can be arbitrary. On a practical level, however, the depth estimation process is problematic and, in most cases, the depth map is corrupted by noise. As a result, the estimated depth map will contain a noise component: $\hat{D}_i = D_i + D_i^{error}$, where $D_i$ is the true depth map, and $D_i^{error}$ is the error component. When rendering the right eye image, the error component would be propagated and most likely be magnified by the rendering function, resulting in undesirable artifacts.

Other conventional methods based on camera motion use planar transform techniques to avoid depth map computation but such approaches have significant limitations as applied to video data with general, arbitrary camera motion. In general, planar transformation techniques involve estimating camera motion from the input video sequence by, for example, computing a fundamental matrix using adjacent frames. The estimated camera motion parameters are then used to derive a planar transformation matrix that is used to transform the current image in the input video image sequence to the hypothetical right eye image. However, the transformation matrix can only be derived when the camera motion only contains horizontal movement. If the camera also moves in the vertical direction, vertical parallax would be created and vertical parallax cannot be removed under any planar transformation. Most depth perception (i.e., 3D or stereo effect in viewing a scene, for example) is obtained in a generally horizontal plane rather than in a vertical plane because the viewer's eyes are spaced apart usually in a generally horizontal plane and respective views are seen according to the stereo base of the distance between the viewer's two eyes. As such, vertical motion or disparity between a pair of sequential images can be incorrectly interpreted by a 2D to 3D conversion system as motion indicative of depth. The planar transform can, though, remove camera rotation, and zooming, therefore create the canonical stereoscopic image pair (i.e. the left and right images are aligned to have the same focal length and parallel focal plane). Under these conditions, if camera motion is limited to horizontal translation, the input video stream of 2D images can be treated as a series of stereo image pairs with small separations.

SUMMARY OF THE INVENTION

Various embodiments described herein include methods and systems for generating stereoscopic image pairs from a monocular sequence of 2D images having arbitrary camera motion, wherein a disparity map on a target image is directly estimated using camera motion and optimization techniques that take into account errors of the disparity map generation, so that the process of generating the target image is less sensitive to the estimation noise of the disparity map.

In one exemplary embodiment of the present invention, a method for 2D to 3D conversion includes determining camera motion parameters between consecutive images in a monoscopic sequence of 2D images, wherein the consecutive images comprise a current reference image and an adjacent image, determining a horizontal disparity map for a target image using the camera motion parameters, determining a disparity probability value for each disparity vector of the disparity map, and determining a target image as a weighted average of pixel values in the current reference image using the disparity probability values, such that the target image and current reference image comprise a stereoscopic image pair.

For example, in one embodiment of the present invention, a horizontal disparity map is determined by constructing a cost function that includes a pixel matching cost function component which determines a cost of matching a pixel in the current reference image to a pixel in the adjacent image under the horizontal disparity map and a smoothing cost function component that considers the similarity of disparity values of neighboring pixel locations in the horizontal disparity map to obtain a smooth horizontal disparity map.

In addition, in one exemplary embodiment of the present invention, the disparity probability values for the disparity vectors of the disparity map are determined by constructing a probability function model of the horizontal disparity map where the value of the disparity vectors for each pixel are considered random values that can be one of a plurality of discrete values. The probability function model may be constructed by converting the cost function components of the cost function into corresponding energy functions associated with the probability model.

Even further, in one exemplary embodiment, the probability function model is a Markov Random Field model, wherein the Markov Random Field is defined by a first and second energy functions, wherein the first energy function corresponds to a matching cost function and wherein the second energy function corresponds to a smoothness cost function. A probabilistic inference algorithm, such as a Belief Propagation algorithm, can be used to determine a disparity probability value for each disparity vector of the disparity map.

In one embodiment of the present invention, before estimating a disparity map, an amount of vertical camera motion between the current reference image and adjacent image can be determined using the camera motion parameters, wherein a planar transform can be used to compute a target image from the current reference image, if the amount of vertical motion is below a predetermined threshold.

In an alternate embodiment of the present invention, a system for converting a two-dimensional image sequence into a three-dimensional image includes an image data buffer for storing consecutive images in a first monoscopic sequence of 2D images, wherein the consecutive images comprise a current reference image and an adjacent image and an image data processing system. In one embodiment, the image data processing system includes a camera motion estimation module to determine camera motion parameters between the consecutive images stored in the image data buffer, a disparity map estimation module to determine a horizontal disparity map for a target image using the camera motion parameters and to determine a disparity probability value for each disparity vector of the disparity map, and an image rendering module to determine a target image as a weighted average of pixel values in the current reference image using the disparity probability values, such that the target image and current reference image comprise a stereoscopic image pair.

BRIEF DESCRIPTION OF THE DRAWINGS

The teachings of the present principles can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present principles advantageously provide a method and system for generating stereoscopic image pairs from a single sequence of two dimensional (2D) monoscopic images (e.g., 2D video image sequence) having general camera motion. Although the present principles will be described primarily within the context of a specific system for converting 2D images into 3D stereoscopic images in which a left image is a reference image and a right image is a target image, the specific embodiments of the present invention should not be treated as limiting the scope of the invention. For example, in alternate embodiments of the present invention, any first image can be used as a reference image (i.e., right or left image) to derive a stereoscopic image pair.

In accordance with various embodiments of the present invention, 2D to 3D conversion techniques are designed to estimate a disparity map on the right eye image (target) using camera motion parameters that are determined from consecutive 2D images (i.e., reference images) in an input stream and optimization techniques that take into account errors of the disparity map generation, so that the process of generating the right image (target) from an original 2D (reference image) using the estimated disparity map is less sensitive to the estimation noise of the disparity map.

In one embodiment, a disparity field defined on the right image is estimated. The disparity field describes how the pixels of $L_i$ are transferred to the right image $R_i$. For example, if the disparity field is denoted as $D^r$, the right eye image can be transformed from the left-eye image according to equation one (1), which follows:

$$R_i(x,y)=L_i(x+D^r(x,y),y). \tag{1}$$

The disparity field $D^r$ comprises vector data that specifies the amount of shift that is applied to the pixels within the left eye image, $L_i$, to find the corresponding pixels in the right eye image. The vector data are related to the change of perspective between the two stereoscopic images and to the distance from the cameras to the objects of the scene to be filmed. It is to be noted that the disparity field only has a horizontal component, whereby the disparity field (or disparity map) contains a respective displacement value, d, for each respective pixel in the left stereo image view (reference) which when applied to the position (x,y) of a respective pixel in $L_i$ gives the position (x+d,y) of its corresponding pixel in the right stereo image view, $R_i$. In this respect, a disparity map can be considered as a matrix of displacement values, wherein the matrix is the same size as the number of the pixels in each stereo image, such that the matrix contains a single one dimensional displacement value for each pixel in one of the stereo images.

Figure 1:
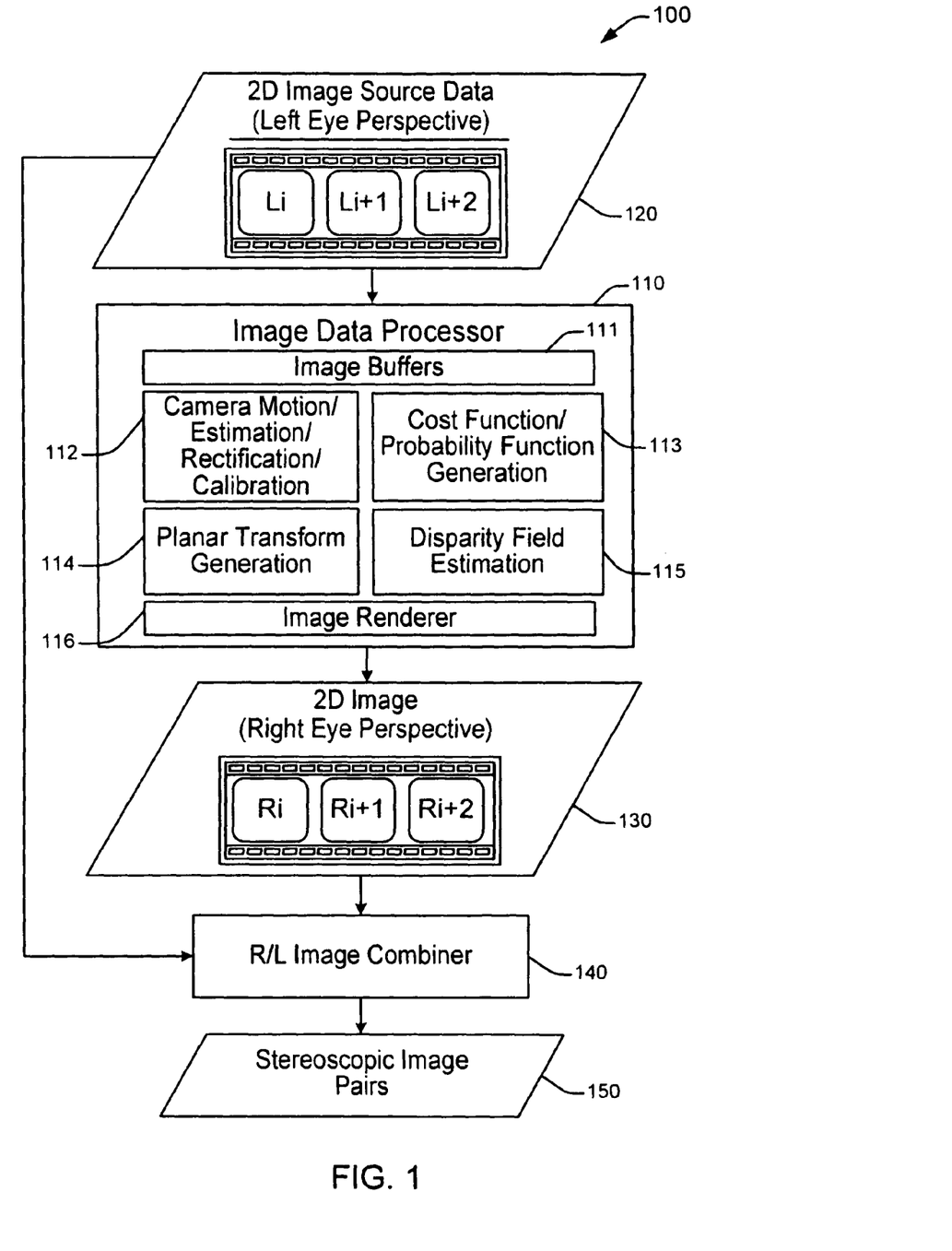
FIG. 1 depicts a high-level block diagram of a system for converting a 2D image sequence into 3D stereoscopic images in accordance with an embodiment of the present invention.

FIG. 1 depicts a high-level block diagram of a system 100 for converting a 2D image sequence into 3D stereoscopic images in accordance with an embodiment of the present invention. In general, the system 100 comprises an image data processor 110 that is configured to process an input first (monoscopic) sequence of 2D digital images 120 and generate a second (monoscopic) sequence of 2D digital images 130 from the first monocular sequence of 2D images 120 using various image processing and optimization methods as will be described below. In the exemplary embodiment of FIG. 1, the first sequence of 2D images 120 comprises a sequence of 2D reference images $L_i$, $L_{i+1}$, $L_{i+2}$ . . . that, for illustrative purposes, are deemed to be the left eye perspective view of a stereoscopic pair of images, and the second sequence 130 of 2D images 120 comprises a sequence of 2D synthesized (target) images $R_i$, $R_{i+1}$, $R_{i+2}$ . . . that, for illustrative purposes, are deemed to be the corresponding right eye perspective views of the stereoscopic pair of images. In one embodiment, the input 120 can be a video segment captured with camera motion.

The first sequence of 2D images 120 and second sequence of 2D images 130 can be combined together via an image combiner module 140 to generate a sequence of stereoscopic images 150. The sequence of stereoscopic images 150 can comprises separate, but synchronized, left and right image streams providing a stereoscopic image pair stream; a single stream of 3D images in which the corresponding stereoscopic pairs are interlaced to form a 3D image.

In the embodiment of FIG. 1, the image data processor 110 illustratively comprises input image buffers 111, a camera motion estimation module 112, a cost function and probability function generation module 113, a planar transform generation module 114, a disparity field estimation module 115 and an image generator 116. The constituent system components/modules of the image data processor 110 implement various exemplary modes of operations (as will be discussed with reference to the flow diagrams of FIGS. 2 and 3) to generate the 2D right-eye image sequence 130 by measuring camera motion vectors between adjacent, continuous images in the two-dimensional image sequence 120, estimating and optimizing a horizontal disparity map on the right eye images using the motion vectors and probabilistic modeling to minimize disparity map estimation error.

In the embodiment of FIG. 1, the image buffers 111 receive and store a plurality of adjacent image frames in the input sequence of 2D images. The camera motion estimation module 112 determines camera motion parameters between consecutive images in a first monoscopic sequence of 2D images 120, for example, camera motion parameters between a current reference image, $L_i$, and an adjacent image, $L_i+1$. In various embodiments of the present invention, the camera motion estimation module 112 further operates as an image rectification and calibration module to rectify and calibrate the current reference image, $L_i$, and adjacent image, $L_i+1$, so that the current reference image and adjacent image are a canonical stereo image pair.

The function generation module 113 generates costs functions (e.g., Eq. 2 or Eq. 4 as discussed below) that are used to compute an optimized disparity map. As explained below, the cost functions are constructed with a first cost component that determines a pixel matching cost function that considers a cost of matching corresponding pixels in a current reference image, Li, and adjacent image, $L_i+1$, under the disparity mapping as a function of horizontal and vertical motion transformation functions that are used to transform the horizontal disparity map (i.e., for the target image) to the disparity between adjacent reference images $L_i$ and $L_{i+1}$, as well as a smoothing component that considers the similarity of disparity values of neighboring pixel disparities.

The function module 113 generates a probability function that defines a probabilistic model of the target image disparity map, where the disparity values for the pixels are random values that may be one of n discrete states that represent the possible disparity for the pixel. The function generation module 115 can generate a probability function by converting a cost function into a probability function The disparity field estimation module 115 estimates and optimizes disparity fields (or disparity map) for target images using the cost functions, probability functions and parameters generated by the function generation module 113. As explained below, in one exemplary embodiment, the disparity map estimation module 115 determines an initial disparity map by minimizing a cost function or energy functions of a probability model derived from the cost functions to determine probability of disparity values of the disparity map and using the probability values of the disparity as weight values to compute the pixel values of the target image as the weighted average of the pixel values in the reference image. The image rendering module 116 generates and outputs the second sequence of 2D images (e.g., target image) using the estimated disparity maps, wherein corresponding target images 130 and reference images 120 comprise stereoscopic image pairs. The planar transform module 114 can be used to compute a planar transformation matrix that is used to compute target images from reference images under circumstances where camera motion has no or very little vertical camera motion.

The system in FIG. 1 can be implemented in various forms of hardware, software, firmware, special purpose processors, or a combination thereof. The constituent system components and processing steps described herein can be implemented in software as an application comprising program instructions that are tangibly embodied on one or more program storage devices (e.g., magnetic floppy disk, RAM, CD ROM, ROM, Flash memory, etc.) and executable by any device, machine or platform comprising suitable architecture. It is to be further understood that because some of the system components and method steps depicted herein are preferably implemented in software, the actual connections between the system components (or the process steps) can differ depending upon the manner in which the exemplary embodiments of the present principles are programmed.

Figure 2:
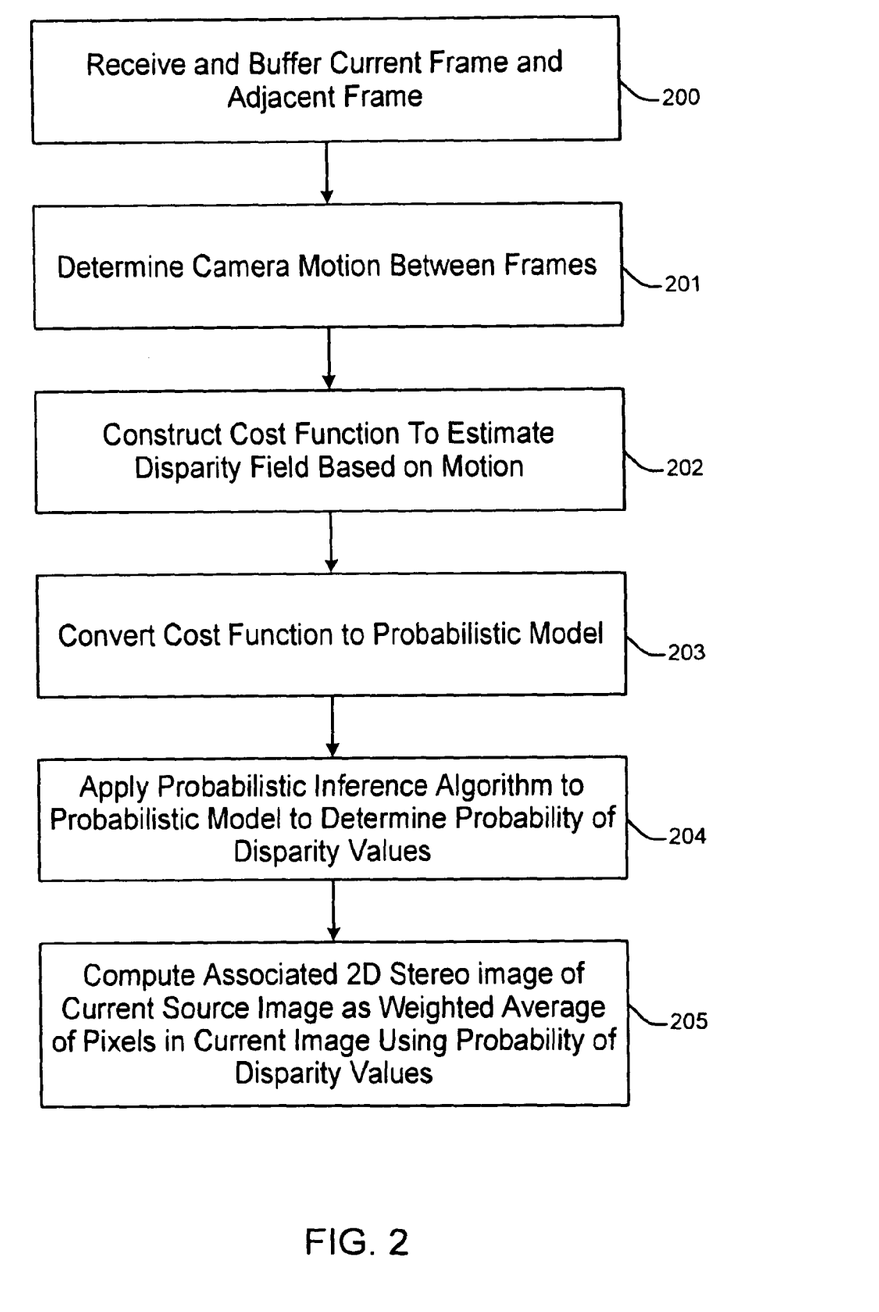
FIG. 2 depicts a flow diagram of a method for converting a 2D image sequence into 3D stereoscopic images in accordance with an embodiment of the present invention.

FIG. 2 depicts a flow diagram of a method for converting a 2D image sequence into 3D stereoscopic images in accordance with an embodiment of the present invention. It is to be understood that the method of FIG. 2 represents only one exemplary mode of operation of the system of FIG. 1. The method begins at step 200 at which a plurality of adjacent frames, including a current frame, $L_i$, and a previous frame, $L_{i+1}$, of the two-dimensional image sequence, for example, are temporarily buffered. The method then proceeds to step 201.

At step 201, an amount and direction of camera motion between adjacent frames is estimated. As noted above, the camera motion parameters are used in a process to estimate a horizontal disparity map that is applied to the current 2D image, Li, to estimate the corresponding right eye image, Ri, to form the stereoscopic pair. In this process, estimating camera motion between the two consecutive 2D source images of the input monoscopic sequence allows for computation of the right image, Ri, wherein the image, Ri, is akin to an image that is consecutive to the current left image, Li, and wherein the disparity vector D is akin to the estimated camera motion vector.

For example, the camera motion between the adjacent images, Li and Li+1, can be estimated by, for example, computing the fundamental matrix using the adjacent frames. As is known in the art, the fundamental matrix relates points in one image to corresponding points in the other image, wherein a disparity mapping between two consecutive input images can be determined by modeling the camera motion between such frames with a fundamental matrix. The method then proceeds to step 202.

At step 202, a cost function is constructed to estimate an optimized disparity map for the target (e.g., right) image based on camera motion. A horizontal disparity map can be generated by minimizing a cost function according to equation two (2), which follows:

$$C(D^r) = \sum_{(x,y)} d\Big(L_i(x, y), L_{i+1}\big(x + H_x(D^r(x, y), y + H_y(D^r(x, y)))\big)\Big)^2 + \sum_{x,y} S(D^r(x, y)). \quad (2)$$

In Eq. (2), d(.,.) denotes the pixel difference, for example, a Euclidean distance. $H_x$, $H_y$ are transformation functions that represent the determined camera motion in the horizontal (x) and vertical (y) directions, respectively, which are used to transform the right eye horizontal disparity map to the disparity between $L_i$ and $L_{i+1}$, so that the pixel difference can be calculated. In the cost function formulation of Eq. (2), image rectification and calibration is taken into consideration using the motion transformation functions. Moreover, in Eq. (2), $S(D^r(x,y))$ denotes a smoothness constraint defined on the disparity field, which can be characterized according to equation three (3), which follows:

$$S(D^r(x,y)) = \|D^r(x,y) - D^r(x-1,y)\|^2 + \|D^r(x,y) - D^r(x,y-1)\|^2. \quad (3)$$

Taking a relatively simple example, if the camera motion is a vertical translation, then only vertical parallax exists between $L_i$ and $L_{i+1}$. If $L_i$ and $L_{i+1}$ are rectified, the disparity in $D^r(x,y)$ can be transformed to the disparity field on $L_i$ by $D_{L_i}(x,y) = \lambda D^r(x,y)$. The cost function in Eq. (2) can be minimized by optimization approaches, for example dynamic programming and belief propagation.

In an alternate embodiment, disparity field estimation can be performed by performing image rectification and calibration as part of the camera motion estimation process, and construction and more simplified cost function. That is, assuming that as part of a camera motion estimation process, two consecutive images $L_{i-1}$ and $L_i$ are to be transformed into a rectified pair, $L'_{i-1}$, and $L'_i$, a disparity map $D^r$ can be estimated by minimizing a cost function according to equation four (4), which follows:

$$C(D^r) = \sum_{(x,y)} d(L_i(x, y), L_{i+1}(x + D^r(x, y))) + \sum_{x,y} S(D^r(x, y)), \quad (4)$$

where d(.,.) is the pixel difference and $S(D^r(x,y))$ is a smoothness constraint as defined in Eq. (2). As compared to the cost function of Eq. (2), the cost function of Eq. (4) does not include an image rectification and calibration component for estimating a horizontal disparity map, as rectification and calibration of adjacent reference images is previously performed as part of the camera motion estimation process.

In general, the cost functions of Eqs. (2) and (4) comprise a pixel matching cost function component that determines a cost of matching a pixel in the current reference image to a pixel in the adjacent image under the horizontal disparity map and a smoothing cost function component that considers the similarity of disparity values of neighboring pixel locations in the horizontal disparity map to obtain a smooth horizontal disparity map. Although an optimized horizontal disparity map can be estimated by minimizing the cost functions, the estimation of the horizontal disparity map using Eqs. (2) or (4), alone, can result in an error that propagates to the right-eye image when there is disparity estimation error, resulting in potential artifacts.

Accordingly, the uncertainty of disparity estimation is considered by using the probability (or confidence) of disparity estimation. Assuming the probability of the disparity value is W(x,y,d), the pixel values of the right image can be set as a weighted average of the pixel values in the left eye image according to equation five (5), which follows:

$$R_i(x, y) = \sum_d L_i(x+d, y) W(x, y, d). \quad (5)$$

The method of FIG. 2, then proceeds to step 203.

At step 203, the weights, W(x,y,d), (i.e., probability values of disparity vectors) can be determined by converting the cost function formulation of Eq. (4) into a probabilistic formulation, and then applying a probabilistic inference algorithm. In this framework, the true disparity values of each pixel are random variables for each pixel location. Each variable can take one of n discrete states, which represent the possible disparities at that pixel location. For each possible disparity value, there is a cost associated with matching a pixel to a corresponding pixel in the corresponding stereo image at that disparity value, where the cost is preferably based on the intensity differences between the two pixels.

Referring again to FIG. 2, the cost function in Eq. (4) can be converted into an equivalent probabilistic formulation according to equation six (6), which follows:

$$\log p(d(.)) = \sum_{(i)} \log \phi_i(d_i) + \sum_{(ij)} \log \psi_{ij}(d_i, d_j) - \log Z \quad (6)$$

where d is the disparity value and i and j are single indices that identify one point in the image. For example, if an image has a size of 320×240, then i=0 represents the pixel at (0,0), i=321 represents the pixel at (1,1), and so on. As such, $d_i$ corresponds to $D^r(x,y)$ in Eq. (3). Comparing Eq. (4) and (6), the result is:

(i) an overall cost function C=log p(d (.)), (ii) a pixel matching cost function $$C_p = \sum_{(i)} \log \phi_i(d_i),$$

(iii) a smoothness cost function $$C_s = \sum_{(ij)} \log \psi_{ij}(d_i, d_j),$$

where $$\phi_i(d_i) = \exp((I(x,y) - I'(x-d(x,y))^2)$$

$$\psi_{ij}(d_i,d_j) = \exp([d(x,y)-d(x\pm1,y)]^2 + [d(x,y)-d(x,y\pm1)]^2)$$

where ± is used because the sign depends on the neighborhood of the pixels. The term log Z is a constant with respect to the disparity map, which does not affect the equivalence of Eq. (6) and Eq. (4). By this conversion, minimizing the cost function of Eq. (4) is equivalent to maximizing the probability function in Eq. (6), where Eq. (5) is also known as a Markov Random Field, in which $\phi_i$ and $\psi_{ij}$ are the potential functions of the Markov Random Field.

Referring back to the method of FIG. 2, at step 204, after converting the cost function to the probabilistic model (e.g., Markov Random Field), the probability values of the disparity $b(d_i=w)$ for a given pixel can be obtained using probabilistic inference algorithms. For example, one inference algorithm that can be used to compute the disparity in accordance with the present invention is the Belief Propagation algorithm, where $b(d_i=w)$ approximates the true probability $p(d_i=w)$, which is the probability of the disparity value at point i (with coordinate x,y) having a value of w, where w is an integer number from 1 to M (M being the maximum disparity value). The method then proceeds to step 205.

At step 205, the associated 2D stereo image, Ri, for the current source image, Li, can be computed as a weighted average of pixels in the current image, Li, using the estimated disparity probability values. In particular, referring to Eq. (5), the value of the weight W(x,y,d) can be set equal to the approximated probability value $b(d_i=w)$ for the disparity value for the given pixel, wherein the index i corresponds to a pixel with coordinate (x,y). The method can then be exited.

The method of FIG. 2 is applicable for general camera motion (horizontal and vertical camera motion). Since a horizontal disparity map is constructed and used to render the target images (e.g., right eye views), a natural stereo-image is generated, despite that the camera motion can have a vertical component. However, if the camera motion has a horizontal component with little or no vertical component, a planar motion transformation can be used to compute the right eye horizontal disparity map and render the target images.

Figure 3:
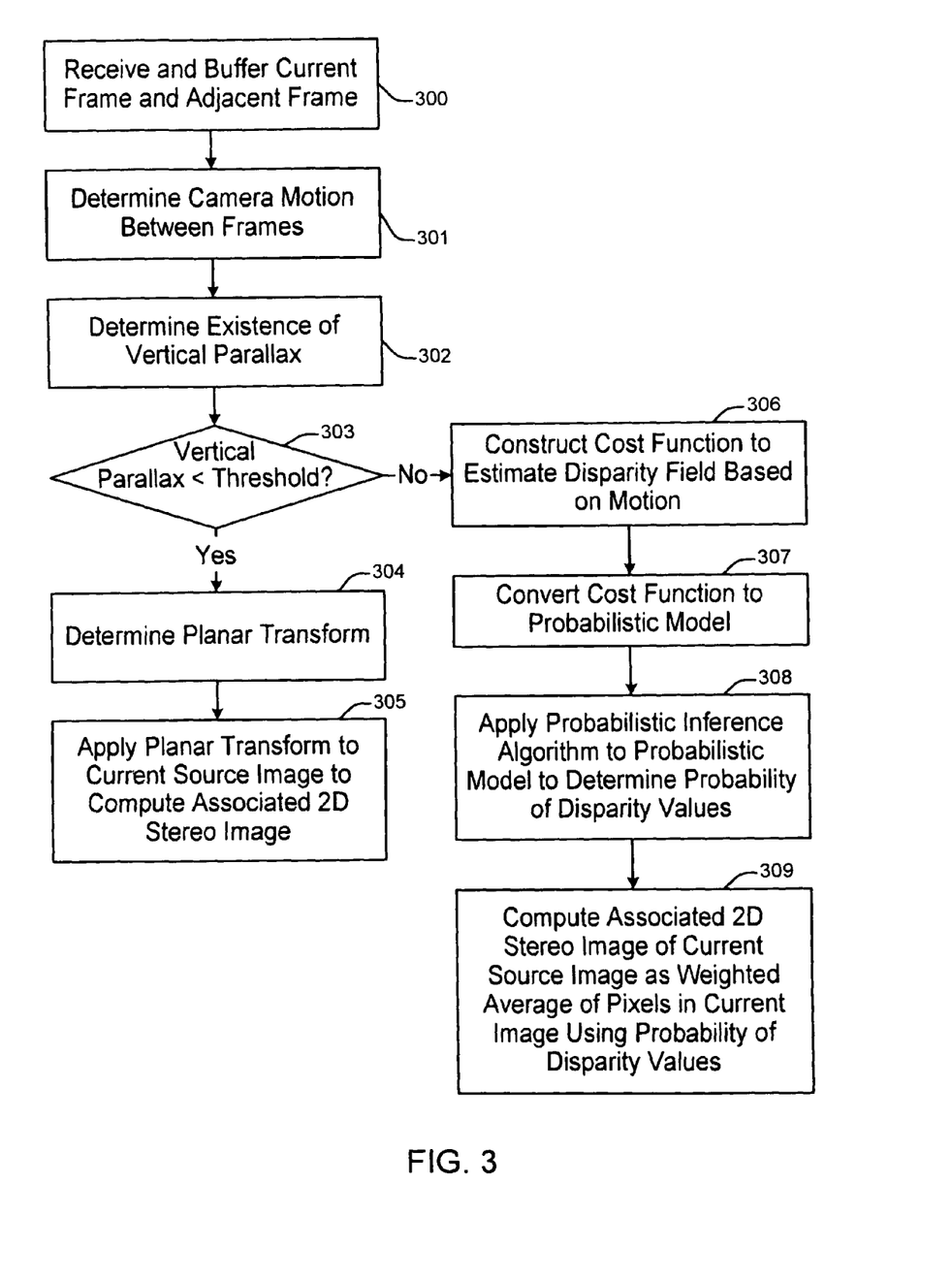
FIG. 3 depicts a flow diagram of a method for converting a 2D image sequence into 3D stereoscopic images in accordance with an alternate embodiment of the present invention.

For example, FIG. 3 depicts a flow diagram of a method for converting a 2D image sequence into 3D stereoscopic images in accordance with an alternate embodiment of the present invention. The method of FIG. 3 represents an alternate embodiment of a method for converting a 2D image sequence into 3D stereoscopic images capable of being executed by the system of FIG. 1. In the method of FIG. 3, the initial steps 300 and 301 are similar to steps 200 and 201 of FIG. 2. More specifically, at step 300 a plurality of adjacent frames, including a current frame, $L_i$, and previous frame, $L_{i+1}$, of the two-dimensional image sequence, for example, are temporarily buffered. The method then proceeds to step 301.

At step 301, an amount and direction of camera motion between adjacent frames is estimated as described above with reference to step 201 of the method of FIG. 2. The method then proceeds to step 302.

At step 302, a vertical parallax detection process is performed to determine the amount, if any, of vertical parallax that may exist. In one embodiment, vertical parallax detection can be realized by trying to rectify the two images ($L_i$ and $L_{i+1}$) in the input sequence. After the rectification transform is calculated, if the rectification involves rotating the $L_i$ image, then vertical parallax must exist. So here the rotation angle can be used as a measure for identifying the vertical parallax. The method then proceeds to step 303.

At step 303, it is determined if the amount of vertical parallax is smaller than a predefined threshold. That is, in one embodiment of the present invention, a detector outputs a value indicating the amount of vertical parallax detected. If the amount of vertical parallax is less than a predefined threshold (positive determination in step 303), the method proceeds to step 304.

At step 304, a planar transform process is performed to estimate the target image, Ri. In particular, a planar transform is constructed using the camera motion parameters using, for example, known methods for constructing planar transforms. The method then proceeds to step 305.

At step 305, the planar transform is applied to the current reference image, Li, to compute the associated target image, Ri. The method can then be exited.

With steps 304 and 305, the camera motion parameters can be used to derive the planar transformation matrix which can be used to transform the reference image, Li, to the target image, Ri. However, the transformation matrix can only be derived when the camera motion only has horizontal motion. If the camera motion has a vertical component, vertical parallax would be created and vertical parallax cannot be removed under any planar transformation. However, planar transform can remove camera rotation and zooming and thus create the canonical stereo pair (i.e., the left and right images are aligned to have the same focal length and parallel focal plane).

Referring back to step 303 of FIG. 3, if, however, the vertical parallax is not less than a predefined threshold (negative determination in step 303), the method jumps to step 306, which is similar to step 202 in FIG. 2 as described above.

That is, at step 306, a cost function is constructed to estimate an optimized disparity map for the target (e.g., right) image based on camera motion as described above with reference to step 202 of FIG. 2. After step 306, the method of FIG. 3 proceeds to step 307.

At step 307, the cost function is converted to a probabilistic model as described above with reference to step 203 of FIG. 2. After step 307, the method of FIG. 3 proceeds to step 308.

At step 308, a probabilistic inference algorithm is applied to the probabilistic model to determine probability of disparity models as described above with reference to step 204 of FIG. 2. After step 308, the method of FIG. 3 proceeds to step 309.

At step 309, the associated 2D stereo image, Ri, for the current source image, Li, can be computed as a weighted average of pixels in the current image, Li, using the estimated disparity probability values as described above with reference to step 205 of FIG. 2. The method can then be exited.

Having described preferred embodiments for a method and system for generating stereoscopic image pairs from a single sequence of two dimensional (2D) monoscopic images (e.g., 2D video image sequence) having general camera motion (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for converting a two-dimensional image sequence into a three-dimensional image, comprising:
   determining camera motion parameters between consecutive images in a monoscopic sequence of 2D images, wherein the consecutive images comprise a current reference image and an adjacent image;
   determining a horizontal disparity map for a target image using the camera motion parameters by constructing a cost function comprising a pixel matching cost function component that determines a cost of matching a pixel in the current reference image to a pixel in the adjacent image under the horizontal disparity map and a smoothing cost function component that considers the similarity of disparity values of neighboring pixel locations in the horizontal disparity map to obtain a smooth horizontal disparity map;
   determining a disparity probability value for each disparity vector of the disparity map;
   determining a target image as a weighted average of pixel values in the current reference image using the disparity probability values, such that the target image and current reference image comprise a stereoscopic image pair;
   determining an amount of vertical camera motion between the current reference image and adjacent image using the camera motion parameters; and
   performing a planar transform to compute a target image from the current reference image using a planar transformation matrix, if the amount of vertical motion is below a predetermined threshold.

2. The method of claim 1, wherein determining disparity probability values for the disparity vectors of the disparity map comprises:
   determining a probabilistic model of the horizontal disparity map where the value of the disparity vectors for each pixel are considered random values that can be one of a plurality of discrete values;
   determining a most probable disparity value for each disparity vector in the disparity map using a probabilistic inference algorithm; and
   applying a probability value associated with the most probability disparity value as the weight value for the given pixel.

3. The method of claim 2, wherein determining a probabilistic model of the horizontal disparity map comprises:
   converting the cost functions into corresponding probabilistic functions.

4. The method of claim 2, wherein the probabilistic model is a Markov Random Field model.

5. The method of claim 4, wherein the Markov Random Field is defined by a first and second probabilistic functions, wherein the first probabilistic function corresponds to a matching cost function and wherein the second probalistic function corresponds to a smoothness cost function.

6. The method of claim 2, wherein the probabilistic inference algorithm is a Belief Propagation algorithm.

7. The method of claim 1, further comprising rectifying the current reference image and adjacent image prior to the step of determining a horizontal disparity map for a target image using the camera motion parameters.

8. A system for converting a two-dimensional image sequence into a three-dimensional image, comprising:
   an image data buffer for storing consecutive images in a first monoscopic sequence of 2D images, wherein the consecutive images comprise a current reference image and an adjacent image; and
   an image data processing unit including:
      a camera motion estimation module to determine camera motion parameters between the consecutive images stored in the image data buffer, the camera motion estimation module further determining an amount of vertical camera motion between the current reference image and adjacent image using the camera motion parameters;
      a disparity map estimation module to determine a disparity probability value for each disparity vector of the disparity map and to determine a horizontal disparity map for a target image using the camera motion parameters by using a cost function comprising a pixel matching cost function component that determines a cost of matching a pixel in the current reference image to a pixel in the adjacent image under the horizontal disparity map and a smoothing cost function component that considers the similarity of disparity values of neighboring pixel locations in the horizontal disparity map to obtain a smooth horizontal disparity man;
      an image rendering module to determine a target image as a weighted average of pixel values in the current reference image using the disparity probability values, such that the target image and current reference image comprise a stereoscopic image pair; and
      a planar transform generation module to compute a planar transform function using a planar transformation matrix and compute a target image from the current reference image using the planar transform function, said computation of the planar transform being performed if the camera motion estimation module determines that the amount of vertical motion is below a predetermined threshold.

9. The system of claim 8, wherein the image data processing unit comprises a cost function generation module to construct the cost function that is used by the disparity map estimation module to determine the horizontal disparity map.

10. The system of claim 8, wherein the image data processing unit comprises a probability function generation module to determine a probabilistic model of the horizontal disparity map where the value of the disparity vectors for each pixel are considered random values that can be one of a plurality of discrete values, and
    wherein the disparity map estimation module determines a most probable disparity value for each disparity vector in the disparity map using a probabilistic inference algorithm and applies a probability value associated with the most probability disparity value as the weight value for the given pixel.

11. The system of claim 10, wherein the probabilistic model is a Markov Random Field model.

12. The system of claim 11, wherein the Markov Random Field is defined by a first and second energy functions, wherein the first energy function corresponds to a matching cost function and wherein the second energy function corresponds to a smoothness cost function.

13. The system of claim 11, wherein the probabilistic inference algorithm is a Belief Propagation algorithm.

14. The system of claim 8, wherein the image data processing unit comprises:
    a cost function generation module to construct the cost function; and a probability function generation module to construct a probability function model of the horizontal disparity map where the value of the disparity vectors for each pixel are considered random values that can be one of a plurality of discrete values, wherein the probability function model is constructed by converting the cost function components of the cost function into corresponding energy functions associated with the probability model.

15. The system of claim 8, further comprising an image rectification and calibration module to rectify and calibrate the current reference image and adjacent image so that the current reference image and adjacent image are a canonical stereo image pair.

16. An image data processing unit comprising:
a camera motion estimation module to determine camera motion parameters between the consecutive images stored in the image data buffer, the camera motion estimation module further determining an amount of vertical camera motion between the current reference image and adjacent image using the camera motion parameters;
a disparity map estimation module to determine a disparity probability value for each disparity vector of the disparity map and to determine a horizontal disparity map for a target image using the camera motion parameters by using a cost function comprising a pixel matching cost function component that determines a cost of matching a pixel in the current reference image to a pixel in the adjacent image under the horizontal disparity map and a smoothing cost function component that considers the similarity of disparity values of neighboring pixel locations in the horizontal disparity map to obtain a smooth horizontal disparity map;
an image rendering module to determine a target image as a weighted average of pixel values in the current reference image using the disparity probability values, such that the target image and current reference image comprise a stereoscopic image pair; and
a planar transform generation module to compute a planar transform function using a planar transformation matrix and compute a target image from the current reference image using the planar transform function, said computation of the planar transform being performed if the camera motion estimation module determines that the amount of vertical motion is below a predetermined threshold.

17. The image data processing unit of claim 16 further comprising a cost function generation module to construct the cost function that is used by the disparity map estimation module to determine the horizontal disparity map.

18. The image data processing unit of claim 16 further comprising a probability function generation module to determine a probabilistic model of the horizontal disparity map where the value of the disparity vectors for each pixel are considered random values that can be one of a plurality of discrete values, and
wherein the disparity map estimation module determines a most probable disparity value for each disparity vector in the disparity map using a probabilistic inference algorithm and applies a probability value associated with the most probability disparity value as the weight value for the given pixel.

* * * * *